United States Patent [19]
Lewis et al.

[11] Patent Number: 6,014,902
[45] Date of Patent: *Jan. 18, 2000

[54] MAGNETIC FLOWMETER WITH DIAGNOSTICS

[75] Inventors: Peter B. Lewis, North Attleboro; Norman Fonteneau, Acushnet, both of Mass.

[73] Assignee: The Foxboro Company, Foxboro, Mass.

[ * ] Notice: This patent is subject to a terminal disclaimer.

[21] Appl. No.: 08/964,303

[22] Filed: Nov. 4, 1997

Related U.S. Application Data

[63] Continuation-in-part of application No. 08/580,509, Dec. 28, 1995.

[51] Int. Cl.[7] .................................................. G01F 1/58
[52] U.S. Cl. ............................................................. 73/861.12
[58] Field of Search .......................................... 73/861.12

[56] References Cited

U.S. PATENT DOCUMENTS

| | | | |
|---|---|---|---|
| 3,834,232 | 9/1974 | Gruner et al. . | |
| 3,991,612 | 11/1976 | Mannherz et al. | 73/194 EM |
| 4,036,052 | 7/1977 | Searle | 73/194 EM |
| 4,503,711 | 3/1985 | Bohn | 73/861.12 |
| 5,301,556 | 4/1994 | Nissen et al. | 73/861.16 |
| 5,327,787 | 7/1994 | Kiene et al. | 73/861.12 |
| 5,370,000 | 12/1994 | Herwig et al. . | |
| 5,375,475 | 12/1994 | Kiene et al. | 73/861.15 |
| 5,426,984 | 6/1995 | Rovner et al. . | |
| 5,895,864 | 4/1999 | Wang et al. | 73/861.12 |

OTHER PUBLICATIONS

U.S. application No. 08/580,509,–Peter Lewis.
Fischer & Porter Company, "Magnetic Flowmeters 50XM1000B, Microprocessor–Based Signal Converter" Publication 24296, Figures 3–18, Schematic Analog Board, Jan. 1990.

*Primary Examiner*—Benjamin R. Fuller
*Assistant Examiner*—Jewel V. Thompson
*Attorney, Agent, or Firm*—Fish & Richardson P.C.

[57] ABSTRACT

A magnetic flowmeter has a tube for supporting fluid flow including a circuit for indicating when the tube is empty to prevent an erroneous flow signal from being provided by the flowmeter, as well as a diagnostic circuit indicating when electrodes in the flowmeter are partially fouled. The circuits include an amplifier connected to two electrodes in the tube and a variable resistor. In a normally operating mode, the amplifier produces an oscillating signal when the tube is empty, and in a diagnostic mode, the amplifier produces an oscillating signal when the electrodes are partially fouled.

12 Claims, 6 Drawing Sheets

MAGNETIC FLOWMETER WITH DIAGNOSTICS

CROSS-REFERENCES TO RELATED APPLICATIONS

This application is a continuation-in-part of U.S. patent application Ser. No. 08/580,509, filed Dec. 28, 1995.

BACKGROUND OF THE INVENTION

This invention relates to diagnostics for a magnetic flowmeter.

Magnetic flowmeters measure the rate of flow of a process fluid through a tube. Magnetic coils mounted on opposite sides of the tube produce a magnetic field perpendicular to the direction of fluid flow in the tube. Electrodes placed in the tube measure a resulting voltage in the fluid that is perpendicular to both the direction of fluid flow and the magnetic field. A processor converts the output of the electrodes to a measure of the rate of fluid flow.

Some magnetic flowmeters are equipped with a circuit that detects the presence of fluid in the tube and prevents the flowmeter from measuring a non-zero flow rate when the tube is empty. One such circuit, manufactured by Fischer and Porter, produces an oscillating signal to indicate that the tube is full. The oscillating signal disappears when the tube is empty.

In operation, the electrodes in a flowmeter can become fouled. Such fouling can adversely affect the signal monitored at the electrodes.

SUMMARY OF THE INVENTION

Electrode fouling, in general, increases the impedance between a flowmeter electrode and the fluid ground tied to the flowmeter tube due to a buildup of an insulating coating on the electrode. As an empty tube also results in an increase in impedance between the electrode and the fluid ground, an erroneous empty tube signal can result if an electrode becomes sufficiently fouled. A flowmeter may be configured such that when an empty tube signal is detected, that is, a high impedance is detected between the electrode and the fluid ground, the flow signal output from the flowmeter may be locked to prevent the output of an erroneous flow rate, due, for example, to signal drift. Therefore, an erroneous empty tube signal due to electrode fouling may result in improper locking of the flow signal. A diagnostic circuit in the flowmeter can detect partial fouling before an erroneous empty tube signal is generated. The same circuit arrangement used to detect an empty tube can be used to provide a diagnostic signal indicating the partial fouling of the electrode. The diagnostic circuit can warn an operator who can respond, for example, by recalibrating the circuit to account for the fouling or by cleaning the electrodes using mechanical or chemical methods.

In general, in one aspect, the invention provides a magnetic flowmeter with a diagnostic circuit that outputs a signal indicating fouling of an electrode of the flowmeter. The flowmeter has a tube for supporting fluid flow and includes a diagnostic circuit for indicating when an electrode in the flowmeter is partially fouled. The invention can include one or more of the following features.

The diagnostic circuit can be repeatedly enabled, for example periodically. When the diagnostic circuit is enabled, and the electrode is partially fouled, the diagnostic circuit can output a substantially oscillating signal.

The flowmeter can include a circuit for indicating when the tube is empty, for example by detecting a high impedance between the electrode and the fluid ground.

The diagnostic circuit and the empty tube detection circuit can include a digitally controlled variable resistance, controlled with a diagnostic control value and an empty tube detection control value respectively. The diagnostic circuit can be enabled by controlling the variable resistance with the diagnostic control value.

Advantages of the invention include the following.

An erroneous empty tube signal due to an electrode fouling can be avoided by periodically enabling the diagnostic circuit to detect the onset of electrode fouling. If electrode fouling is detected, for example, to a degree which will begin to cause erroneous empty tube signals, the flowmeter and diagnostic circuit can be recalibrated to account for the level of fouling.

Another advantage of the invention is that the calibration mode can be used in a troubleshooting situation in order to determine the impedance between an electrode and a fluid ground. The approach avoids difficulties that may be encountered using other impedance measuring techniques, such as using a direct current based ohm-meter.

Other features and advantages of the invention will become apparent from the following description, and from the claims.

DESCRIPTION OF THE PREFERRED EMBODIMENTS

Figure 1:
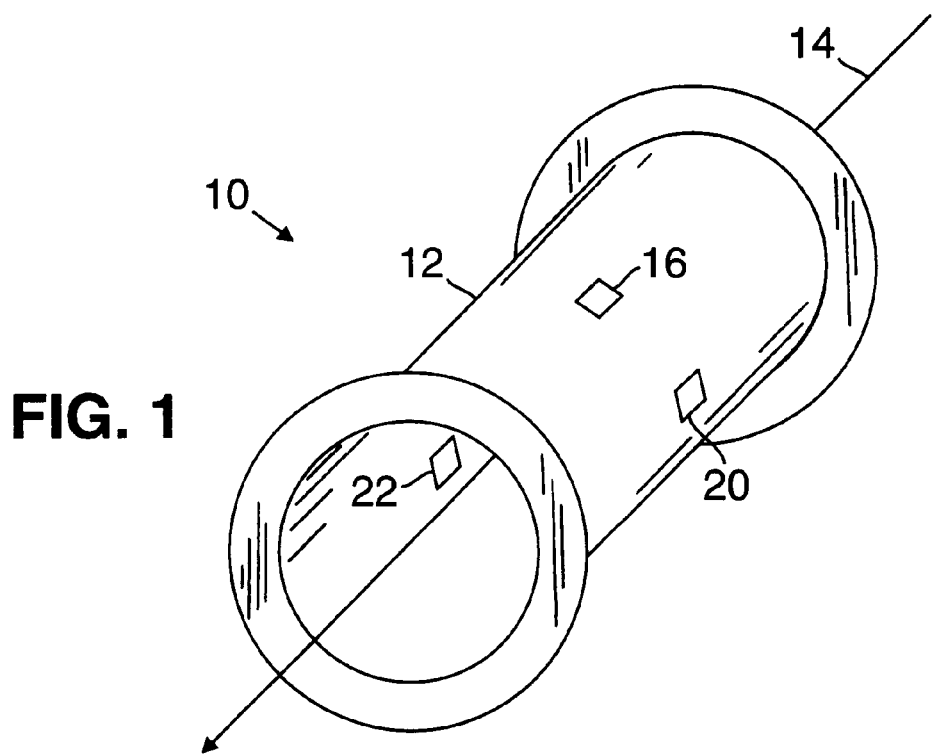
FIG. 1 is a schematic perspective view of a magnetic flowmeter.
Figure 2:
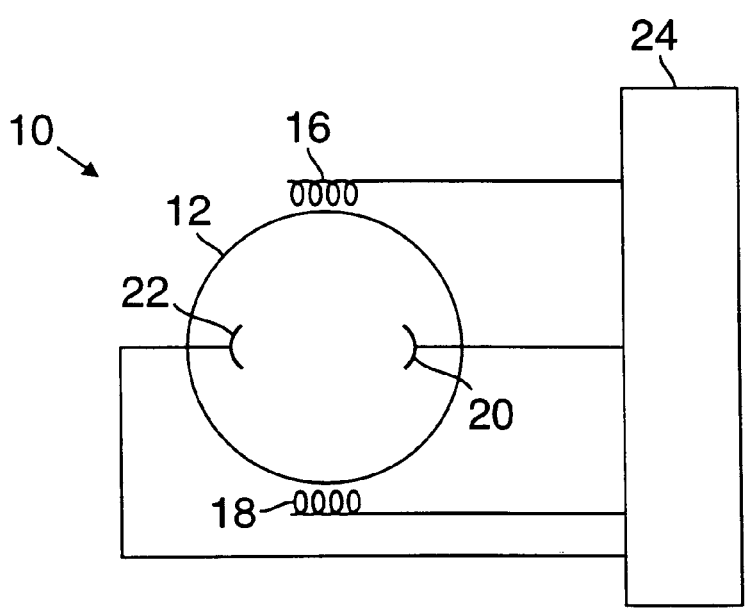
FIG. 2 is a schematic front view of the flowmeter of FIG. 1.

Referring to FIGS. 1 and 2, a magnetic flowmeter 10 has a tube 12 for supporting fluid flow along its longitudinal axis 14. A pair of magnetic coils 16, 18 mounted on opposite sides of the tube create a magnetic field perpendicular to the axis of the tube. Electrodes 20, 22 are disposed on opposite sides of the interior of the tube, along a line perpendicular to axis 14 and the magnetic field. A surface of each electrode is in contact with the process fluid when the tube is full.

Magnetic coils 16, 18 and electrodes 20, 22 are each connected to a processor 24 that controls the current through the coils and converts the output of the electrodes to a flow rate measurement, as well as performing other functions.

Figure 3A:
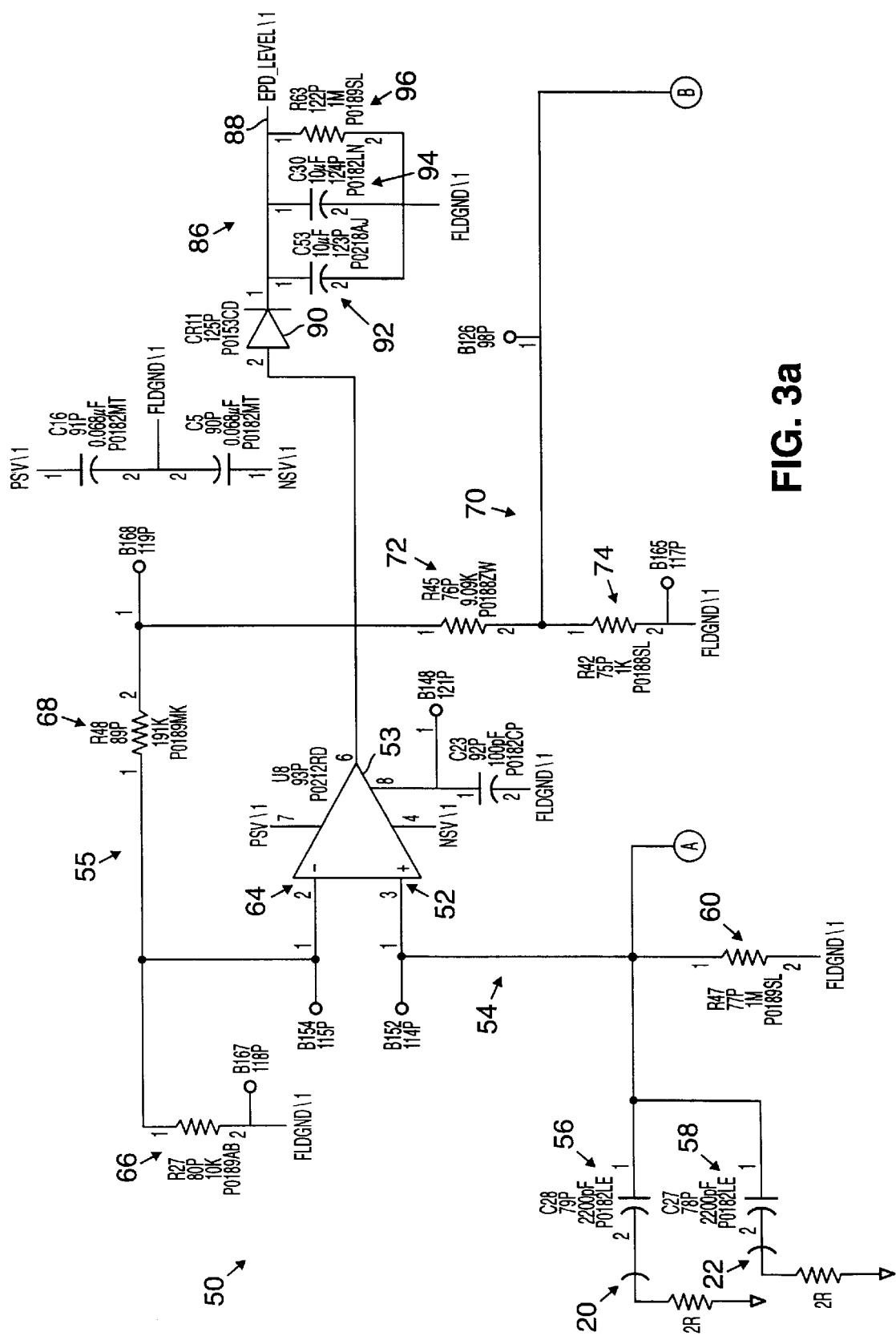
FIGS. 3a and 3b are circuit diagrams of an empty tube detection circuit in the flowmeter of FIGS. 1 and 2.
Figure 3B:
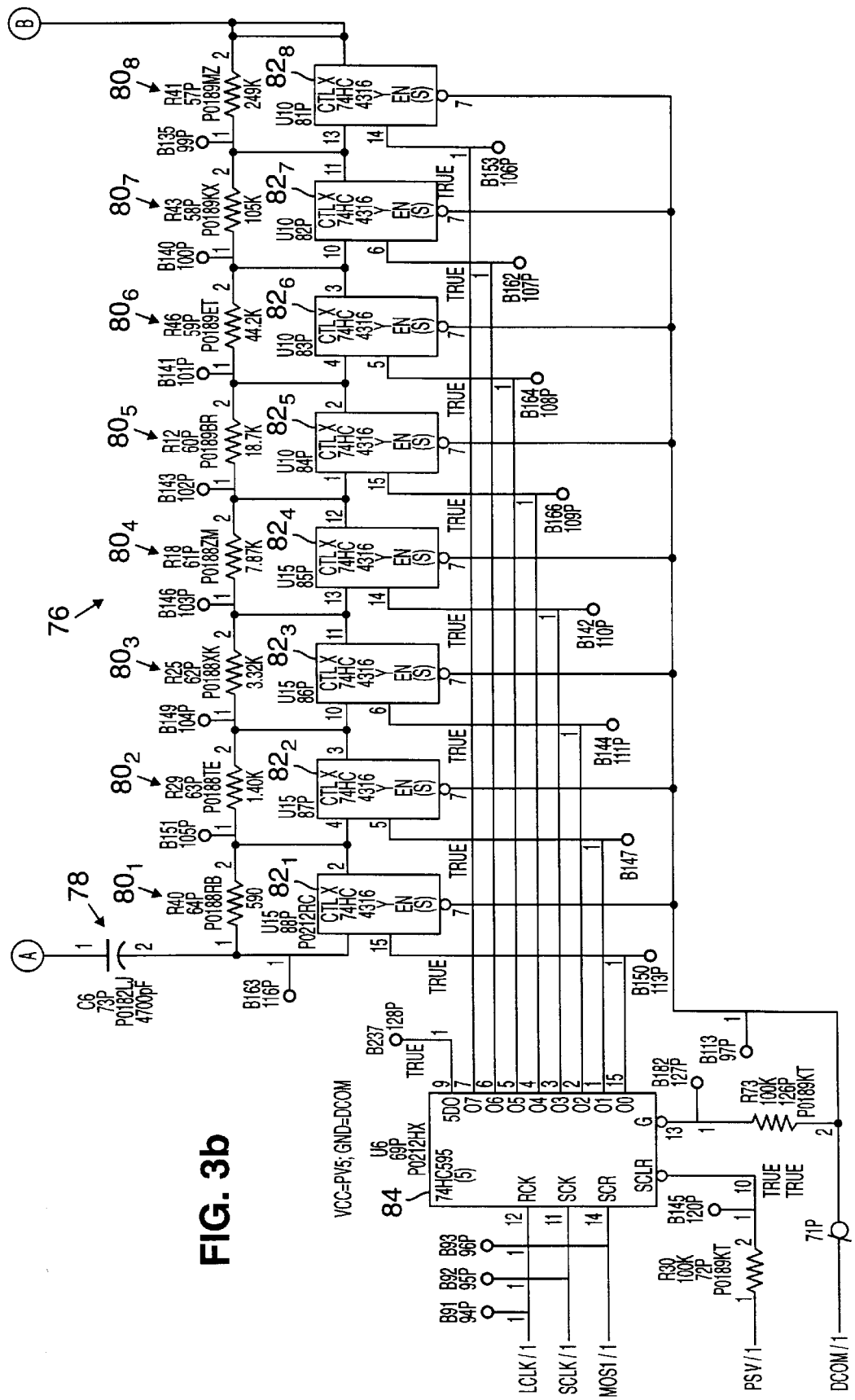

Referring to FIGS. 3a and 3b, processor 24 includes an empty tube detection circuit 50 connected to each electrode 20, 22. The resistance (2R) between each electrode and the fluid ground and between the electrodes depends on the conductivity of the process fluid, the size and placement of the electrodes, and the level of impurities on the inside of the tube. The preferred embodiment of circuit 50 described below is designed for process fluid conductivities ranging from at least 1.5 $\mu\mho$/cm.

Each electrode is connected to a non-inverting input 52 of an operational amplifier 53 via a variable resistance positive feedback path 54. The amplifier also has a fixed resistance negative feedback path 55. When the tube is empty (i.e., both electrodes are completely uncovered), the resistance (2R) between the electrodes and the tube is high, and the positive feedback to the amplifier exceeds the negative feedback and the output of the amplifier oscillates. When the tube is full (i.e., one or both electrodes are at least partially immersed in fluid), and the resistance (2R) between the electrodes and the tube is relatively low, the negative feedback exceeds the positive feedback to the amplifier and the output no longer oscillates. The presence of an oscillating output thus signals to the processor that the tube is empty.

The negative feedback path includes a 10 kOhm resistor 66 connecting an inverting input 64 of the amplifier to ground. The output of the amplifier is fed back to the inverting input of the amplifier via a 191 kOhm resistor 68. The amplifier is biased by a bipolar supply voltage in a conventional manner.

The positive feedback path includes 2200 pF capacitors 56, 58 connecting each electrode to the non-inverting input of the amplifier. The capacitors prevent DC signals from coupling to the electrodes, which could interfere with the flow measurement signal from the electrode. As a result, the electrodes act essentially as AC voltage sources with a source resistance, and the magnitude of the coil current and the presence or absence of fluid flow in the tube do not disturb the empty tube measurement. The outputs of the capacitors are additionally connected to a 1 MOhm resistor 60 to provide a path for the bias current of the non-inverting input.

The output of the amplifier is fed back to the non-inverting input 52 of the amplifier via subcircuit 70. Subcircuit 70 couples the output of the amplifier to ground via a 9.09 kOhm resistor 72 connected in series to a 1 kOhm resistor 74. These resistors attenuate the output of the amplifier to prevent a large signal from being coupled back to the electrodes.

The output of resistor 72 is coupled to the non-inverting input of the amplifier by a variable resistor 76, with resistance $R_S$, connected in series with a 4700 pF capacitor 78. Capacitor 78 compensates for the capacitive reactance of parallel capacitors 56, 58. The amplifier is thus stable at DC when the negative feedback exceeds the positive feedback.

Variable resistor 76 includes eight resistors $80_1, \ldots, 80_8$ connected in series and having varying resistances. For example, in the embodiment shown, resistors $80_1$ to $80_8$ have values of 0.590, 1.40, 3.32, 7.87, 18.7, 44, 105 and 249 kOhm, respectively.

Each resistor $80_1, \ldots, 80_8$ is connected in parallel to a switch $82_1, \ldots, 82_8$ coupled to an output of a shift register 84. Shift register 84 receives digital signals from the processor, and varies the resistance of resistor 76 by selectively opening or closing the switches. Shift register 84 outputs eight binary signals which taken as an 8-bit unsigned number is a control value $C_s$ which is approximately linearly related to the resulting variable resistance $R_s$. The value of the resistance is 1.5 kOhms when all the switches are on ($C_s=0$), and 431 kOhms when all the switches are off ($C_s=255_{10}$). As described in more detail below, the minimum resistance of the variable resistor is lower than the resistance ($R_{min}$) at which the circuit will oscillate when the tube is full. In addition, the maximum resistance of the variable resistor exceeds the highest resistance ($R_{max}$) at which the circuit will not oscillate when empty.

The output of amplifier 53 is also connected to a rectifier 86 which provides a DC signal 88 to a CMOS inverter. The inverter provides a digital signal to the processor indicating whether the tube is full or empty. The rectifier includes a diode 90 connected in series to a 10 $\mu$F capacitor 92, 10 nF capacitor 94 and a 1 MOhm resistor 96, all connected in parallel.

In operation, the processor causes the magnetic coils 16, 18 to produce an alternating magnetic field in the tube 12 (FIG. 1). This causes electrodes 20, 22 to supply an AC signal to amplifier 53. Above a threshold resistance established by variable resistor 76, the positive feedback exceeds the negative feedback, thus the amplifier produces an oscillating output. When the positive feedback is less than the negative feedback, the output of the amplifier is a low voltage DC signal.

Figure 4:
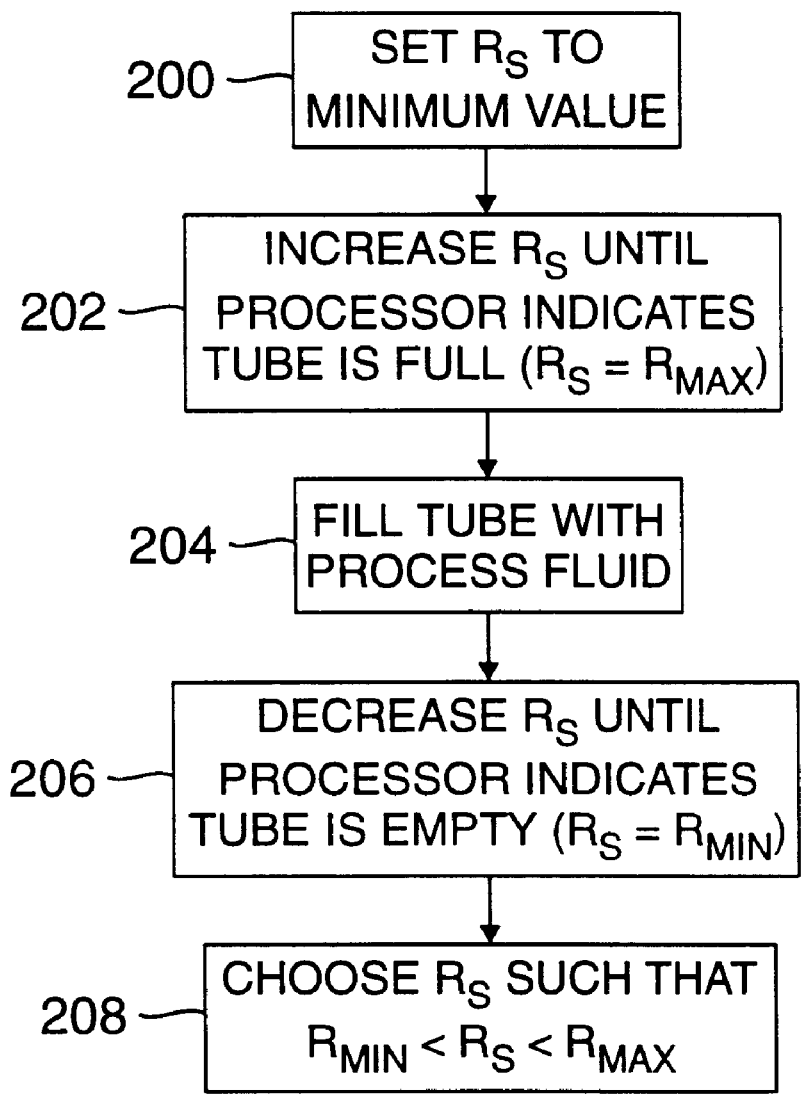
FIG. 4 is a flowchart for a calibration procedure for the flowmeter of FIGS. 1 and 2.

Before the flowmeter is shipped to an end user, a technician calibrates the flowmeter circuitry using the method shown in FIG. 4. When the tube is empty, and the resistance between the electrodes and the tube is high, the technician instructs the processor to set the variable resistance to a low value (e.g., the minimum value of 250 Ohms) (step 200). This causes the positive feedback to the amplifier to exceed the negative feedback, and the output of the amplifier oscillates. The oscillating output of the amplifier is converted to a high DC signal by the rectifier, and the inverter converts this signal to a digital logic High signal indicating to the processor that the tube is empty. This triggers the processor to interrupt the flow measurement, and indicate to the user that the tube is empty.

The technician then gradually increases the variable resistance until the positive feedback no longer exceeds the negative feedback input to the amplifier, and the output of the amplifier stops oscillating (step 202). The DC signal at the output of the rectifier is now a low signal, which the inverter converts to a logic Low signal indicating that the tube is full. To avoid this error during use, the technician must set the variable resistance at a value below this threshold resistance ($R_{max}$) by setting the control values below to corresponding control value $C_{max}$.

Next, the technician fills the tube with a particular process fluid, e.g., by connecting the tube to a pipeline (step 204). This causes the resistance between the electrodes and the tube to decrease (in relation to the conductivity of the fluid) and prevents the output of the amplifier from oscillating. The technician then continues his calibration by decreasing the variable resistance until the positive feedback to the amplifier exceeds the negative feedback, and the circuit resumes oscillating (step 206). To prevent an erroneous empty tube reading based on this signal, the variable resistance ($R_S$) must be set to a value ($R_{SP}$) that exceeds this threshold resistance ($R_{min}$) but remains below $R_{max}$ (step 208). The control value corresponding to variable resistance $R_{min}$ is $C_{min}$.

The technician then repeats steps 200 through 208 for another process fluid, having another fluid conductivity. He then either stores in the processor appropriate values of $R_{SP}$ for each fluid, or he derives an equation relating $R_{SP}$ to $R_{min}$ and stores this equation, in terms of variable resistor control values $C_{SP}$ and $C_{min}$, in the processor. One setting that works well for process fluid conductivities between 1.5 $\mu\mho$/cm to 325 $\mu\mho$/cm is:

$$C_{SP}=64+1.5C_{min} \qquad (1)$$

Conductivities that vary greatly from those given above may require a different formula or a variable resistor with a different range of resistances to be employed. It is sufficient to derive $R_{SP}$ based only on $R_{min}$ since $R_{max}$ is related to $R_{min}$.

An end user then chooses a flowmeter, calibrated according to the process described above, that is appropriate for the particular process fluid the user wishes to measure. The user then sets up the flowmeter by indicating to the processor the type of fluid to be measured. If a lookup table is used, the processor matches the fluid type to its corresponding resistance $R_S$ stored in memory, and sets the variable resistance to that value.

Alternatively, if the processor stores an equation in the form of Equation (1), the user first ensures that the tube is full before activating the processor for calibration. The processor turns all switches off so that the variable resistor is at a maximum value. Because this resistance exceeds $R_{min}$, the amplifier does not oscillate and the processor indicates a full tube. The processor then gradually decreases the variable resistance until the amplifier oscillates and an empty tube signal is generated. The value of the resistance that causes the empty tube signal is set to $R_{min}$. The processor then calculates $R_S$ from $R_{min}$ based on Equation (1).

The user re-activates the calibration procedure whenever the type of process fluid changes, or when an insulating coating builds up on the electrodes during fouling. Alternatively, the processor automatically re-calibrates the circuit at set intervals.

Figure 5:
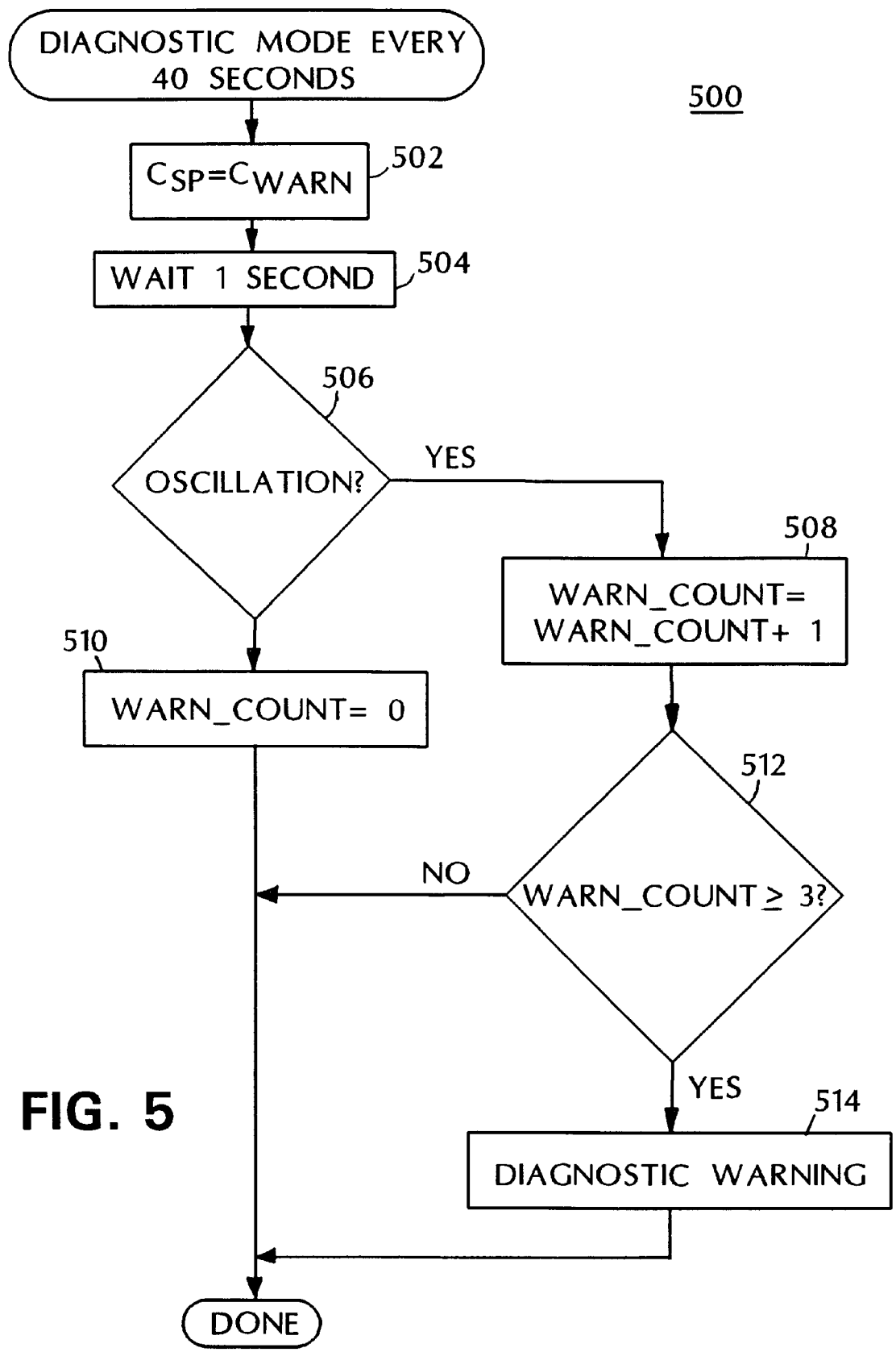
FIG. 5 is a flowchart of a periodic diagnostic procedure.

After calibration, as electrodes 20,22 become partially fouled, the resistances between the electrodes and the fluid ground may increase to the point that the circuit oscillates, in error indicating that the tube is empty. Referring to FIG. 5, a diagnostic mode 500 is entered periodically, in this embodiment every 40 seconds, in order to detect such a fouling condition prior to oscillation of the empty tube detection circuit with the variable resistor set to $R_S = R_{SP}$. In this mode, the variable resistance is set to a value $R_S = R_{WARN}$, where $R_{WARN}$ is approximately 80% of $R_{SP}$ by setting the corresponding variable resistance control value to $C_{WARN} = 0.8 C_{SP}$ (step 502). After waiting one second (step 504) the signal is tested for oscillation (step 506). If the circuit oscillates at this setting of variable resistance for three consecutive cycles, a diagnostic message is sent alerting the operator that an electrode fouling condition may exist. Specifically, a warning counter is incremented if the circuit oscillates (step 508) and reset to zero if it does not (step 510). If the warning counter reaches 3, (step 512) then a diagnostic warning message is issued (step 514). By requiring that the circuit oscillate during more than one consecutive cycle, for example, by requiring oscillation during three consecutive cycles as described above, the system is less sensitive to transient conditions such as a gas bubble or a solid passing through the tube. In response to an electrode fouling warning message, an operator can enter the automatic recalibration mode to determine a new value of $R_{min}$, clean the electrodes, or otherwise handle the electrode fouling condition.

Figure 6:
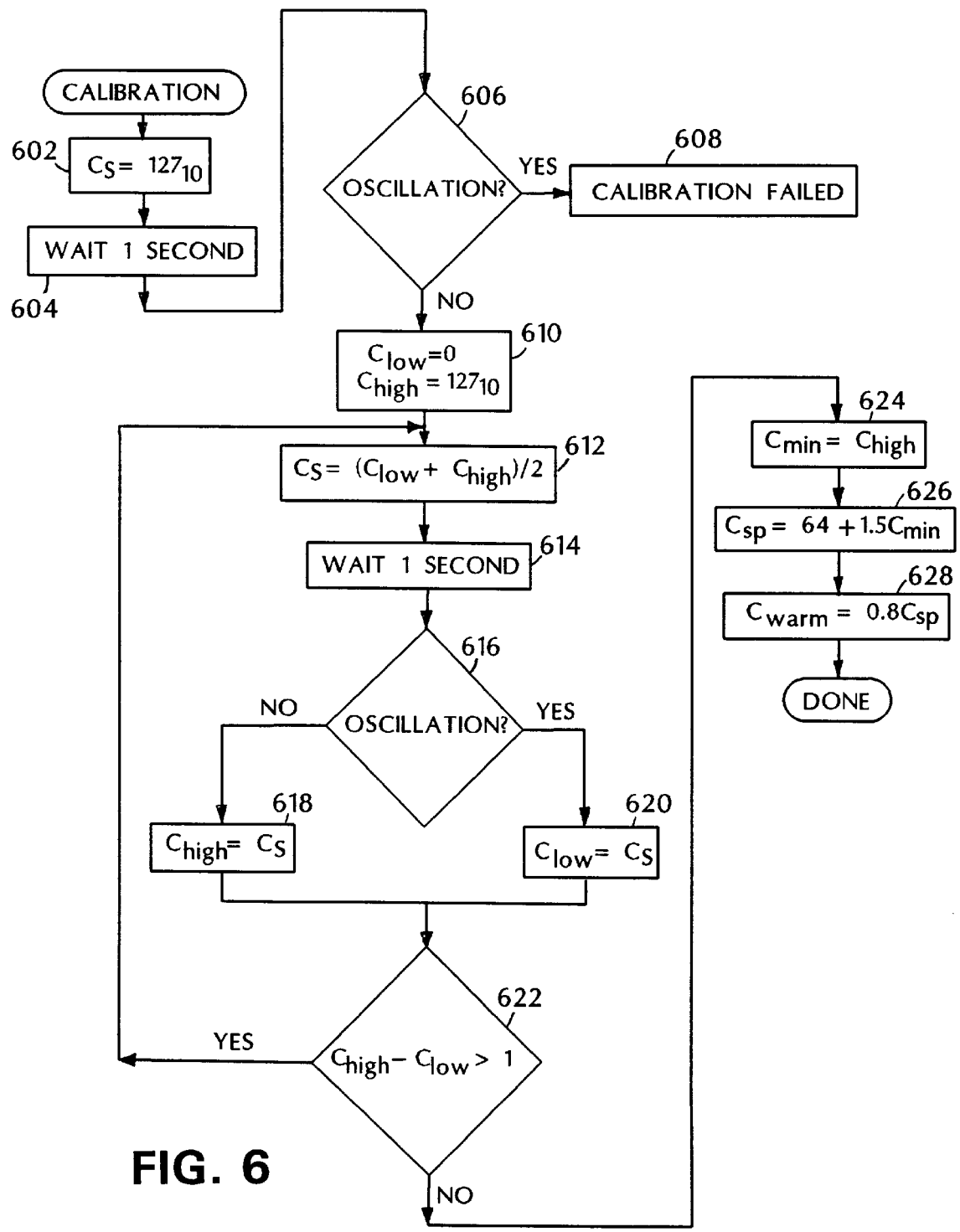
FIG. 6 is a flowchart of an alternative calibration procedure.

An alternative automatic calibration mode can be used to determine $R_{min}$, the setting of the variable resistance below which the outputs oscillate when the tube is full. Rather than gradually decreasing $R_S$ until oscillation is achieved, a binary search can be used as shown in FIG. 6. The control value $C_S$ for variable resistor 76 is set to $127_{10}$ (step 602). After waiting for 1 second (step 604) the signal at electrodes 20,22 is tested for oscillation (step 606). If the signal is oscillating, calibration fails (step 608) since the oscillation indicates, for example, that the electrode resistance or the fluid resistivity are unexpectedly high. If the signal does not oscillate at this initial control value, a binary search is performed to find the minimum control value $C_S$ such that the signal does not oscillate. An initial range of control values from $C_{low} = 0$ to $C_{high} = 127_{10}$ is set at step 610. A control value is chosen at the midpoint of the current range (step 612) and then the system waits for 1 second (step 614). Oscillation of the electrode signal is tested (step 616) and either the $C_{low}$, is increased to $C_s$ (step 620) in the case of oscillation, or $C_{high}$ is reduced to $C_s$ if there is no oscillation (step 618). If a range of control values remains between $C_{low}$ and $C_{high}$ (step 622) the cycle is repeated, otherwise $C_{min}$ is set to $C_{high}$ (step 624), the lowest control value that does not result in oscillation. The control value $C_{SP}$ is set according to equation 1 (step 626) and the electrode fouling warning level $C_{WARN}$ is set to $0.8 C_{SP}$ (step 628).

In another embodiment of the invention, an automatic calibration mode of the types described above and shown in FIG. 6 can be used to determine the impedance from between an electrode and a fluid ground in a trouble-shooting mode. The calibration is controlled by an operator trouble-shooting a flowmeter or other equipment including an electrode immersed in a fluid. The variable resistance $R_S$ of variable resistor 76 is varied in a sequence, in particular the sequence corresponding to the binary search shown in FIG. 6. For any value of $R_s$, in the sequence, there is a corresponding resistance R between each of the electrodes and the fluid ground above which the positive feedback to the operation amplifier exceeds the negative feedback, than therefore the output of the amplifier oscillates. If the calibration procedure fails (step 608) then there may be an open circuit due, for example, to a broken wire, a faulty tube to fluid ground connection, a fouled electrode, or a non-conductive fluid. If the calibration procedure succeeds then an open circuit can be ruled out and a value of R can determined from $C_{min}$. In particular, at the end of a successful calibration, the value of R can be bounded based on the greatest value of $R_S$ for which the circuit oscillated and lowest value of $R_s$ for which it did not.

Other embodiments can use any of a number of methods of varying the circuit characteristics to enable a diagnostic mode. For example, other types of controlled variable resistances can be used, including multiplying digital-to-analog converters and analog multipliers. Any of a number of circuits for supplying a digital control signal can be used rather than the shift register (serial-to-parallel converter) in the above embodiments.

Other embodiments are within the following claims.

For example, the values of various components in circuit 50 are varied to accommodate process fluids with different conductivities. Alternatively, values of capacitors 56, 58, 78 are decreased to 1500 pF to create a circuit less sensitive to low frequencies. In other embodiments, the capacitance of the capacitors exceeds 200 pF to increase the sensitivity of the amplifier.

Instead of using resistors 72, 74, the output of the amplifier can be attenuated by decreasing the supply voltages to the amplifier or limiting the amplifier's output swing with zener diodes.

Temperature correction circuits can be connected to the circuit to compensate for fluctuations in the temperature of the process fluid.

What is claimed is:

1. A magnetic flowmeter comprising:

a tube for supporting a fluid flow;

an electrode mounted in the tube used to measure a rate of the fluid flow; and a diagnostic circuit receiving an output of the electrode and providing an output signal which indicates when the electrode is partially fouled.

2. The flowmeter of claim 1 wherein the diagnostic circuit includes a means for repeatedly enabling the circuit.

3. The flowmeter of claim 1 wherein after the diagnostic circuit is enabled, the output signal substantially oscillates if the electrode is partially fouled.

4. A circuit for processing the output of an electrode in a fluid-supporting tube of a magnetic flowmeter comprising:

a device receiving an output of the electrode; and a diagnostic subcircuit connected to the device, the diagnostic subcircuit causing an output signal of the device to oscillate if the electrode is partially fouled.

5. The circuit of claim 4 further comprising:

a second subcircuit connected to the device, the second subcircuit causing an output signal of the device to oscillate when the tube is empty of fluid.

6. The circuit of claim 5 further comprising a means for repeatedly enabling the diagnostic subcircuit.

7. The circuit of claim 6 wherein the diagnostic subcircuit and the second subcircuit include a digitally controlled variable resistance with a diagnostic control value and a second control value respectively, and wherein enabling the diagnostic subcircuit includes controlling the variable resistance with the diagnostic control value.

8. A method for detecting when an electrode immersed in a fluid has partially fouled, comprising:

measuring an output of the electrode normally immersed in fluid;

providing the output to a circuit;

configuring the circuit so that the circuit provides an non-oscillating output when the electrode is not fouled; and providing an indication that the electrode has partially fouled based on an oscillating output of the circuit.

9. A method for detecting a high impedance between two electrodes normally immersed in a fluid and a fluid ground, the method comprising:

measuring an output of the two electrodes;

providing the output to a circuit;

configuring the circuit so that the circuit provides an oscillating output when a high impedance is present between the electrodes and the fluid ground;

providing an indication that the electrodes are not immersed based on the oscillating output, periodically determining whether the electrodes have partially fouled, including configuring the circuit so that the circuit provides a non-oscillating output if the electrodes are immersed and have not fouled and provides an oscillating output if the electrodes are immersed and have partially fouled.

10. The method of claim 9 wherein configuring the circuit includes controlling a digitally controlled variable resistor.

11. A method for measuring a resistance between an electrode normally immersed in a fluid and a fluid ground, the method comprising:

providing an output of the electrode to a circuit;

configuring the circuit such that the output oscillates if the resistance is greater than a predetermined value.

12. The method of claim 11 further comprising:

sequentially configuring the circuit such that the output oscillates if the resistance is greater than a corresponding sequence of values; and determining that the resistance is bounded by two of the sequence of values.

\* \* \* \* \*